United States Patent [19]

Marks et al.

[11] 4,399,379

[45] Aug. 16, 1983

[54] AIR COOLED MACHINE AND COOLING FAN

[75] Inventors: Stephen W. Marks; Gary D. Wooten; Ronald N. Gray, all of Anderson, Ind.

[73] Assignee: General Motors Corporation, Detroit, Mich.

[21] Appl. No.: 218,164

[22] Filed: Dec. 19, 1980

[51] Int. Cl.³ .............................................. H02K 9/06
[52] U.S. Cl. ........................................ 310/62; 310/58; 310/63; 415/170 A
[58] Field of Search ...................... 310/62, 263, 63, 52, 310/58, 53, 89, 59, 680, 64, 65; 98/43 C; 416/93 R; 415/170 A; 417/353, 354

[56] References Cited

U.S. PATENT DOCUMENTS

| 1,020,699 | 3/1912 | Kieser | 415/170 A |
| 1,999,163 | 4/1935 | Allen | 415/170 A |
| 2,209,109 | 7/1940 | Bungartz | 415/170 A |
| 2,993,449 | 7/1961 | Harland | 310/62 |
| 3,228,342 | 1/1966 | Page | 415/170 A |
| 3,252,025 | 5/1966 | Brown | 310/263 |
| 3,398,696 | 8/1968 | Sproule | 415/170 A |
| 3,538,362 | 11/1970 | Cheethan | 310/68 D |
| 3,548,226 | 12/1970 | Sato | 310/263 |
| 3,666,978 | 5/1972 | Renner | 310/89 |

FOREIGN PATENT DOCUMENTS 880951 10/1961 United Kingdom .................. 310/62

Primary Examiner—R. Skudy
Attorney, Agent, or Firm—Charles R. White

[57] ABSTRACT

A fan assembly has a sealing ring which rotatably fits with a similar feature on a machine casting when the fan is assembled to the machine to provide a labyrinth type seal which is maintained over a wide variation and axial gap to inhibit the flow of air bypassing the normal flow through the machine so that the fan pumps greater quantities of air through the machine for improved cooling of all elements therein.

4 Claims, 3 Drawing Figures

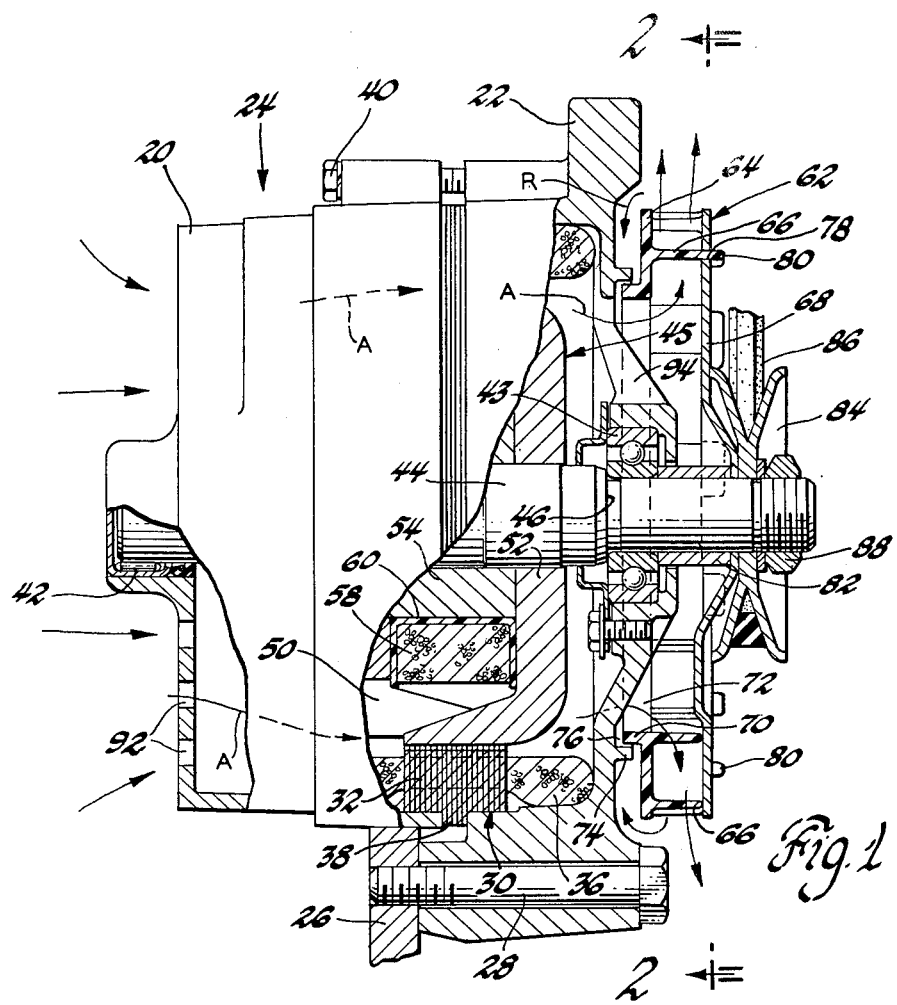
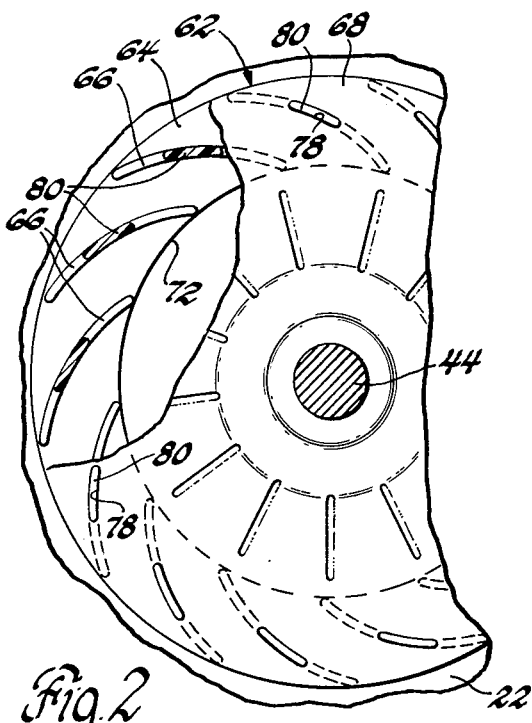
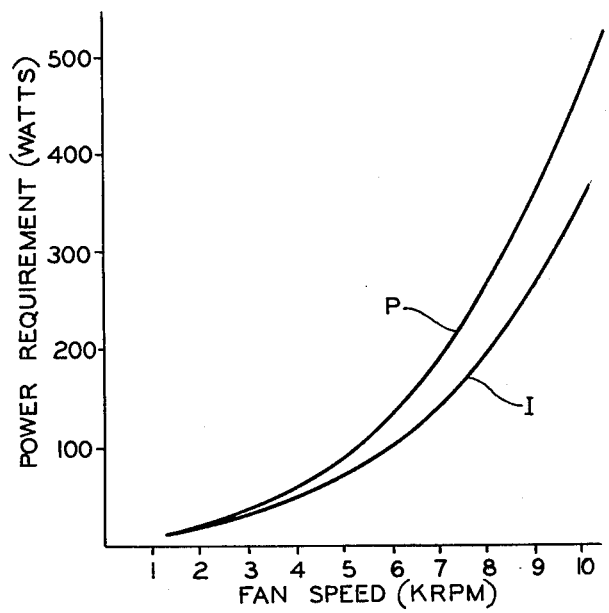

AIR COOLED MACHINE AND COOLING FAN

This invention relates to an air cooled machine and cooling fan combination in which concentric interfaced sealing rings on the fan and machine housing respectively provide a labyrinth air seal to inhibit recirculation of fan discharge air into the fan intake to improve fan pumping efficiency and to reduce fan noise generation.

Prior to the present invention, machines such as engine driven electrical generators in automobiles have been provided with fan assemblies to draw cooling air through the generator housings to cool the components therein. While these prior fan constructions provided adequate cooling to provide for long generator service life, fan generated noises were often high and fan operating efficiencies often did not meet expectations.

The present invention provides a new and improved labyrinth air seal between the fan assembly and the housing of rotatable machinery which is effective to inhibit the flow of fan discharge air back into the fan intake so that fan efficiencies are improved, power input requirements to drive the fan are lowered and fan generated noises are reduced. Furthermore, manufacture is improved since the air sealing arrangement of this invention allows for a wide range of axial gaps between the housing and fan assembly while providing effective sealing so that cooling air will primarily flow through the housing of the machine. In this invention warping of the fan assembly from thermocycling is reduced as compared to prior plastic constructions.

The preferred embodiment of the fan assembly of this invention has a multi-bladed first part molded from plastic to which is affixed a steel baffle plate forming the second part. The plastic part is preferably attached to the metallic annular baffle plate by hot upset of plastic tabs which extend through corresponding slots in the baffle plate. The baffle plate is slightly larger in diameter than the plastic part to afford protection from foreign objects contact with the blades while the fan is in operation. The plastic part has a projecting sealing ring which rotatably fits within a larger diameter sealing ring on the machine casting when the fan assembly is mounted to the machine to provide a new and improved labyrinth type air seal. These sealing rings have controlled diameters to ensure proper fit so that the resulting radial gap therebetween can be maintained over a wide variation in axial gap between the end of the machine and the fan assembly to provide for improved quality of quantity produced machines. With the gap or restricted clearance between the two cooperating rings providing a labyrinth air seal, this fan construction is effective for maintaining nearly constant air flow for a wide range of axial gaps and with improved efficiency over a standard fan in which no comparable sealing construction is provided.

It is a feature, object and advantage of this invention to provide a new and improved air cooled machine and fan assembly which incorporates a pair of cooperating rings on a machine housing and a fan assembly respectively which rotate relative to one another and which provide therebetween a tortuous air passage and a labyrinth air seal therebetween to block the flow of recirculating or machine housing bypass air into the fan so that the fan pumps larger quantities of the air directly through the machine housing for improved air cooling of all components therein.

Another feature, object and advantage of this invention is to provide a new and improved air cooled machine which incorporates an external cooling fan which effects the flow of cooling air through the machine housing and which has an axially extending sealing ring that interfits with an axially extending ring on the machine housing to block the flow of recirculating air into the fan so that most of the air pumped by the fan is through the housing of the machine to air cool components therein.

Another feature, object and advantage of this invention is to provide a generator and cooperating fan assembly for cooling the generator rotor assembly and other components therein which has new and improved labyrinth sealing construction between the generator housing and the fan assembly to inhibit the flow of air bypassing the housing into the fan inlet so that the fan pumps most of the cooling air through the generator housing for improved cooling efficiency and to effectively reduce fan generated noise levels.

These and other features, objects and advantages of this invention will be more apparent from the following detailed description and drawing in which:

FIG. 1 is a side elevational view partially in cross-section of an electrical generator as mounted in a vehicle engine compartment which illustrates a preferred embodiment of this invention;

FIG. 2 is an end view with parts broken away of the generator of FIG. 1 taken along lines 2—2 of FIG. 1; and FIG. 3 is a graph illustrating operation of this invention.

Turning now in greater detail to the drawings and more particularly to FIG. 1, the reference numerals 20 and 22 designate end frames forming a housing of a diode-rectified alternating current generator 24 which is mounted by a suitable bracket 26 and mounting bolt 28 to an engine within the engine compartment of an automotive vehicle. The end frames 20 and 22 support a stator assembly 30 which includes the usual magnetic core 32 formed of steel laminations that have slots which receive a conventional three-phase stator winding 36. Some of these laminations have large diameters 38 by which are clamped between the end frames 20 and 22 drawn together by through bolts 40 extending through openings in end frame 20 into threaded connection with end frame 22.

The end frames 20 and 22 carry suitable bearings 42, 43 respectively which rotatably support a centralized shaft 44 that forms part of a rotor assembly 45. The bearing 43 is a ball bearing assembly whose inner race bears against a shoulder 46 of the shaft 44. The rotor assembly, in addition to the shaft 44, comprises pole members 50 and 52 and an enclosed core 54 formed of magnetic material. These pole members have interleaved fingers as shown and described in the U.S. Pat. No. 3,252,025 to Brown et al and Cheetham et al. U.S. Pat. No. 3,538,362 hereby incorporated by reference. The rotor assembly 45 includes a field coil 58 which is wound on a spool 60 positioned about the core 54 and between the pole members 50 and 52. The opposite ends of the field coil 58 are respectively connected with slip rings not shown but which are disclosed in the above referenced U.S. Pat. No. 3,538,362.

As shown in the drawing, the shaft 44 projects outwardly from the drive end frame 22 to support an annular fan assembly 62 for rotation therewith. The fan assembly has two major components; the first being a ring-like fan cap 64, molded or otherwise made from fiber filled nylon, having a circular arrangement of integral arcuate blades 66 to which the second component, a saucer-like steel fan baffle 68, is secured. The fan cap 64 has a cylindrical wall 70 projecting inwardly toward the face of the drive end frame 22. The inner surface 72 of wall 70 provides the outer limits of the air intake to the fan assembly 62. The wall 70 which forms part of and rotates with the fan assembly 62 fits with close, fixed and continuous clearance within the stationary annular projecting wall 74 of the end frame 22. The tortuous air passage 76 thus provided between these two cylindrical walls forms a labyrinth air seal which is of importance to fan operation as will be further explained below.

As best illustrated by FIG. 2, the fan baffle 68 is provided with a plurality of curved slots 78 which match and receive the curved tabs 80 that are integral with and project from the outer side edges of the fan blades through the slots. By hot upset of the extending portions of these tabs, the fan baffle and fan cap are secured together to form the fan assembly 62. The fan assembly is axially positioned with respect to the driven end frame 22 by a cylindrical spacer 82 mounted on the extending end of shaft 44 and abuts at its inner end against the inner race bearing 43 and at its outer end against the inner surface of the fan baffle 68. A pulley 84 rotatably driven by the vehicle engine through a V-belt 86 is mounted on shaft 46 outboard of the fan assembly 62. A nut 88 threaded on the end of shaft 44 provides compression load urging the pulley 84, fan assembly 62 and spcer 82 and bearing 43 axially, jamming the inner race of bearing 43 against shoulder 46 so that the rotational drive of the pulley by the belt 86 effects corresponding rotation of the shaft 46, the rotor assembly 45 and the fan assembly 62.

When rotatably driven, the rotor effects production of electrical current and heat generated on generator drive is dissipated by a stream of cooling air drawn through air inlet openings 92 in the end frame 20 across the rotor and other components of the generator and through exhaust openings 94 in the end wall of the end frame 22 by action of the radial flow fan as indicated by the flow arrows A.

With the fan driven by the V belt 86 and with the high velocity air entering into the inlet of the fan assembly, a low pressure occurs in the inlet area. Some of the air discharged by the fan assembly represented by arrow R recirculates into this low pressure area. However, with the labyrinth seal provided by the cooperation interfaced cylindrical walls 70, 74 of the fan assembly and end frame, only reduced quantities of recirculated air are able to pass through or otherwise penetrate the labyrinth seal. Under such conditions, the fan does not have to repump air just discharged by the fan, and more air is drawn through the end frame for cooling the rotor of the machinery. This materially increases fan pumping efficiency and provides for more effective cooling of the rotor and other components of the generator in which excessive heat is generated. Additionally, with reduced quantities of recirculating air entering the fan there is reduced turbulence as the inner boundary layer separates from the inside wall 70 of the intake of the fan. Since the blades of the fan encounter reduced turbulence, noise generated by such encounter is effectively reduced.

The curves in FIG. 3 compare the power requirements of a standard prior art fan as compared with the new and improved machine and fan assembly of this invention. The curve P of the prior fan assembly shows that the power requirements for fan drive is materially greater than that of this invention, curve I, with its new and improved air sealing construction.

While the embodiment of this invention as herein disclosed constitutes a preferred form of this invention, it is to be understood that other embodiments may now become adopted as may come within the scope of the claims of our invention.

The embodiments of the invention in which an exclusive property or privilege is claimed are defined as follows:

1. The combination of a machine having an air cooled rotor operatively mounted within the housing thereof and a rotatable fan spaced closely adjacent to one end of said housing to draw cooling air therethrough, said fan having an air intake and an air discharge, a rotatable shaft extending into said housing for driving said rotor, said housing having air inlet and outlet openings in opposite ends thereof, said fan being mounted on said shaft exteriorly of said housing and having a plurality of blades extending therefrom for drawing air through said housing by way of said inlet and outlet openings, and first and second axially extending ring means respectively extending from said housing and said fan into an overlapping relationship with one another with continuous clearance to permit relative rotation and to provide a restricted labyrinth air seal therebetween so that air discharged from said fan will be blocked from recirculation into the intake of said fan thereby permitting the fan to pump increased quantities of air through said housing for increased cooling efficiency.

2. The combination defined in claim 1 wherein said ring means extending from said fan has an inner annular wall and wherein said air intake of said fan is bounded by said inner annular wall of said last recited ring means.

3. The combination of an air cooled rotor operatively mounted within a housing and a rotatable fan assembly spaced rearwardly of and closely adjacent to one end of said housing to draw cooling air therethrough to dissipating heat generated upon rotation of said rotor, a rotatable shaft extending into said housing for driving connection with said rotor, said housing having air inlet openings at one end thereof, and outlet openings at the other end thereof, said fan being mounted on said shaft adjacent said last mentioned end of said housing and having a plurality of outwardly extending blades for pumping air through said housing via said inlet and outlet openings and first and second axially extending ring means extending from said housing and said fan respectively to overlie one another in close proximity to each other to provide a restricted and continuous air passage therebetween so as to form a labyrinth seal to inhibit the flow of recirculation air from the space between said housing and said fan into the fan intake bounded by said second ring means thereby permitting the fan to pump increased quantities of cooling air through said housing for increased cooling efficiency.

4. The combination of an air cooled rotor operatively mounted within a housing and a rotatable fan spaced rearwardly of and adjacent to one end of said housing to draw cooling air therethrough, a rotatable shaft extending into said housing for driving said rotor, said housing having an air inlet opening at one end thereof and an air outlet at the other end thereof, said fan being mounted on said shaft exteriorly of said housing and having an axial intake adjacent to said air outlet of said housing, said fan having a plurality of outwardly extending blades for pumping cooling air through said housing, and first and second axially extending ring means projecting from said housing and said fan respectively to overlie one another with continuous clearance to cooperatively provide a restricted air passage therebetween inwardly of the outer limits of said fan so that air discharged from said fan will be inhibited from recirculating into the intake of said fan thereby permitting the fan to pump increased quantities of air through said housing for increased air cooling efficiency.

* * * * *